United States Patent [19]

Leuchs et al.

[11] 4,345,363
[45] Aug. 24, 1982

[54] METHOD OF CONTINUOUSLY MAKING FLEXIBLE, HEAT INSULATED METAL TUBING

[75] Inventors: Ottmar Leuchs, Hannover-Bothfeld; Hans-Jürgen Klöppner, Langenhagen; Otto Uhlmann, Burgdorf, all of Fed. Rep. of Germany

[73] Assignee: Kabel und Metallwerke Gutehoffnungshütte AG, Hanover, Fed. Rep. of Germany

[21] Appl. No.: 940,496

[22] Filed: Sep. 8, 1978

[51] Int. Cl.² .................... B22D 11/126; B28B 21/54
[52] U.S. Cl. ............................. 29/527.4; 264/177 R; 264/176 R; 264/171; 264/173; 29/527.2
[58] Field of Search ............ 29/157.3 R, 527.2, 527.4; 264/177 R, 176 R, 171, 173

[56] References Cited

U.S. PATENT DOCUMENTS

| | | | |
|---|---|---|---|
| 2,687,997 | 8/1954 | Marchand | 264/177 R X |
| 3,550,258 | 12/1970 | Ondiorne | 29/527.2 |
| 3,895,085 | 7/1975 | Suzaki et al. | 264/177 R |

Primary Examiner—Francis S. Husar
Assistant Examiner—V. Rising
Attorney, Agent, or Firm—Ralf H. Siegemund

[57] ABSTRACT

Extruded, drawn and coiled copper tubing with wall thickness of 0.7 to 2 mm is soft annealed, straightened and jacketed in an extruder with a blend of polyvinyl chloride, chalk, a plasticizer and other additives for lubrication and stabilization. The jacket has inwardly extending ribs defining channels inbetween to enhance heat insulation.

7 Claims, 2 Drawing Figures

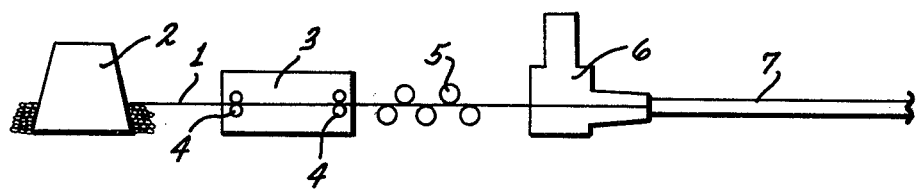
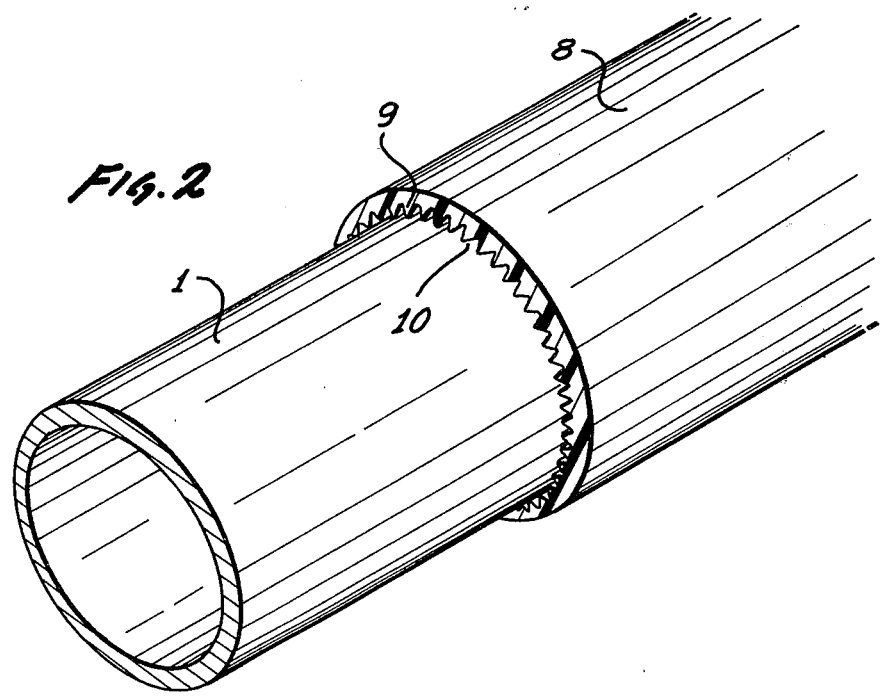

METHOD OF CONTINUOUSLY MAKING FLEXIBLE, HEAT INSULATED METAL TUBING

BACKGROUND OF THE INVENTION

The present invention relates to a method for continuously manufacturing flexible, heat-insulated, metal tubing for use in home construction or the like.

It is known generally to use heat-insulated metal tubes for conducting gases, vapors or liquids having a temperature differing from ambient. The insulation jacket is either provided onto the tubing in the tube making plant, or in situ upon installation of the tubings. The latter procedure is not economical due to labor cost. However, even pre-insulated tubes are difficult to install and installation is also time-consuming and, therefore, expensive. Also, the known heat-insulated tubes are expensive to make, even in a plant.

DESCRIPTION OF THE INVENTION

It is an object of the present invention to provide a new and improved method for economically making heat-insulated tubes which are easy to install, and provide adequate heat-insulation when installed in buildings and used for central heating, hot water supply, etc.

In accordance with the preferred embodiment of the present invention, it is suggested to use a seamless drawn copper tube having a wall thickness between 0.7 to 2 mm, and an outer diameter of 8 to 35 mm. The tubing, after having been made, is coiled and withdrawn from the coil to be soft-annealed in a protective gas atmosphere. Immediately after annealing, the tube is cooled and passed to and through an extruder for extruding thereon a jacket of a thermoplastic polymer, and having inwardly extending ribs which bear against the surface of the tube. The ribs taper in radial inward direction and are rather closely spaced to form arch-shaped elongated (axial) cavities or channels. The thermoplastic material to be used is a composition that includes 35% to 60% polyvinyl chloride (a preferred range being 45% to 55%); 15% to 40% chalk as a filler; 15% to 30% phthalic acid ester as softener or plasticizer and 2% to 5% lead containing stabilizer.

A seamless copper hollow is preferably extruded from a copper billet and worked preferably in a pilgrim step type rolling mill for reducing its diameter as well as the wall thickness. The rolled hollow is subsequently drawn in several steps under utilization of a die and a mandrel, for further reducing the dimensions of the hollow to form the final configuration of the metal tube. Copper is suited best, particularly for use as plumbing in buildings because it is quite corrosion proof. Also, copper inhibits the growth of bacteria, which grow rather lively in plastic tubes. The stated wall thickness in a range from 0.7 to 2 mm is adequate indeed to withstand the usual water pressure or the pressure of other media.

It is most economical to draw the tube in the final state through a die and coil it onto a drum or the like. The force needed for drawing is provided by the drive for the coiling and storage drum. One may coil up to 400 meter length of such tubing depending on the diameter and wall thickness of the tubing. The tubing has been cold drawn at room temperature and is cold-work hardened accordingly. Thus, the drawn tubing is not very flexible and will be soft-annealed (spheroidize annealing) in a protective gas atmosphere to prevent tarnishing and to reduce the susceptibility to corrosion.

After annealing the tube is cooled, also in a protective gas atmosphere, and is fed to an extruder. Straightening of the tubing in appropriate roller tracks upstream as well as downstream from the annealing station is advisable to ensure that a uniform jacket is applied in and by the extruder. As stated, the jacket is to have radially inwardly directed ribs whose apeces bear against the copper to be and establish arch-shaped axial channels. These gas filled channels enhance the effective heat-insulation to a considerable extent.

The above-mentioned composition of which the jacket is made is rather inexpensive due to the rather larger filler content, and the insulation it provides is quite good. The plasticizer permits easy working by and in the extruder and the lead containing stabilizer prevents discoloration and decompositioning of the plastic. For optical reasons, one will chose an ivory color for the plastic.

The heat insulated tubing in accordance with the invention is inexpensive and easy to install. One can bend it easily even by hand or by means of simple tooling even for curving the tube in a small radius.

The basic mixture can be improved particularly for working in the extruder by adding about 1% (also by weight) of a lubricant. For this, one should preferably use a long chain ester heard wax. The above mentioned plasticizer should be comprised of about ⅔ branched phthalicacid ester and about ⅓ linear chain phthalicacid ester. This improves the cold resistance of the coating and envelope.

The stabilizer is preferably tribasic lead sulfate, i.e. a lead sulfate in which lead oxide has been included. The mixture should additionally have a small amount of lead stearate which serves as lubricant as well as stabilizer.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a schematic view of process equipment used for practicing the preferred embodiment of the invention; and FIG. 2 is a perspective, cut open view of tubing made in accordance with the present invention.

Proceeding now to the detailed description of the drawings, copper tubing 1 has been coiled on a truncated cone 2 and is now withdrawn therefrom, preferably through a straightening roller track (not shown), and is run into and through continuous type annealing furnace 3. After a store 2 has been emptied, another one is put in place, and the ends are secured to each other to obtain endless tubing.

The device 3 is preferably constructed for heating the tubing through direct, resistive heating while the tubing is enveloped in protective gas. The current is fed to the tube by means of rollers 4. A relatively high electric current heats the copper tube to temperatures which reverse the hardening that had resulted from cold working of the tube. The protective gas prevents the tube from tarnishing. The chamber of device 3 could be extended and/or partitioned, so that the annealed tubing is cooled under protective gas.

As the annealed tube emerges from the heating device 3, and after or during cooling, a set of straightening rollers 5 straightens the tube before being fed to an extrusion head 6. The extruder jackets the tube with a particular heat insulating envelope or jacket. After curing the jacketed tube, it is coiled in coilings, and in 25 to 50 m length.

FIG. 2 shows the jacketed tube denoted 7 in FIG. 1 in a larger scale. The heat insulating envelope 8 has radially inwardly projecting and tapering ribs 9. The ribs have triangular cross-section defining and establishing arch-shaped channels 10. These channels enhance the heat insulative properties of the jacket 8 to a considerable extent.

The particular jacket or envelope 8 is, for example, made from a blend and composition of the following components, and a preferred mixture includes (all percentages by weight): 46% polyvinylchloride; 26% chalk; 15% branched phthalates; 8% blended strain linked phthalates; 2.7% tribasic lead sulfate; 0.3%-28%- lead stearate; 0.8% of a very long chain ester hard wax, and 1.2% dyes or pigments.

These components are blended in a stirrer and thoroughly wetted. The mixture is then fed to an extruder (not shown) and plastified at 180° C. The plastified material is forced at the end of the feed screw against an aperture plate and granulated by shear forces using any known cutting device. The resulting granulate is cooled and used to charge the extruder 6 to obtain the jacket 8.

It will be observed that the mixture has a rather high content in filler material (chalk) and still, extrusion is not difficult as the long chain ester hard wax, as well as the lead stearate serve as lubricant. The rather inexpensive filler permits this blend to be made at low cost. The polyvinylchloride has preferably a K-value of 70; this feature together with the chalk are beneficial for the strength of the ribs. In other words, after curing, these ribs 9 of the jacket 8 resist rather strongly any attempts to deform them under load.

The cold strength of the jacket 8 and its resistance to cold is very good. In other words, even at cold temperatures the tubes remain flexible. Thus, the heat insulated pipe as made can be embedded in plaster or stucco.

The invention is not limited to the embodiments described above but all changes and modifications thereof not constituting departures from the spirit and scope of the invention are intended to be included.

We claim:

1. Method of making a flexible, heat insulated tube for home construction purposes or the like, in a continuous process, comprising:

providing a stock of coiled, seamless drawn copper tube having a wall thickness of about 0.7 to 2 mm and an outer diameter of 8 to 35 mm;

providing a blend of 35 to 60% polyvinylchloride; 15 to 40% chalk; 15 to 30% phthalicacid ester as plasticizer; and 2 to 5% lead containing stabilizer, all percentages by weight;

soft annealing and cooling said tube both under protective gas; and extruding the blend onto and around the cooled tube and in such a manner that the blend as extruded forms a jacket with radially inwardly directed, tapering ribs engaging the tube and defining heat insulating arch-shaped channels in between.

2. Method as in claim 1, the annealing step being carried out as a direct resistive heat step of the copper tube.

3. Method as in claim 1, said blend including, additionally, up to 1% lubricant.

4. Method as in claim 3, said lubricant being a long chain ester hard wax.

5. Method as in claim 1 or 4, said plasticizer being about ⅔ branched phthalicacid ester and about ⅓ linear chain phthalicacid ester.

6. Method as in claim 1 or 4, said stabilizer being a tribasic lead sulfate.

7. Method as in claim 3 or 4, said blend including from 45 to 55% polyvinyl chloride and 25 to 30% chalk.

* * * * *